United States Patent Office 3,567,794
Patented Mar. 2, 1971

3,567,794
PROCESS FOR PREPARING 1,2-BUTADIENE
Kenneth C. Eberly, Akron, Ohio, assignor to The Firestone Tire & Rubber Company, Akron, Ohio
No Drawing. Filed July 18, 1968, Ser. No. 745,686
Int. Cl. C07c 11/16, 1/26
U.S. Cl. 260—680
9 Claims

ABSTRACT OF THE DISCLOSURE

The process disclosed herein comprises a method for preparing 1,2-butadiene by the zinc dust, etc. dehydrochlorination of dichlorobutene, specifically 2,3-dichloro-1-butene, or 1,2-dichloro-2-butene, or a mixture thereof. Such dichlorobutene can be prepared by the reaction of 1,2,3-trichlorobutane with solid KOH. Advantageously the trichlorobutane is prepared by the reaction of chlorine with either 1-chloro-2-butene or 3-chloro-1-butene or a mixture thereof. One of the advantages of the present process is the fact that 1,3-butadiene can be reacted with concentrated hydrochloric acid to give a mixture of the above mentioned monochlorobutenes. Thus the process provides a relatively inexpensive method of preparing 1,2-butadiene from 1,3-butadiene.

BACKGROUND OF THE INVENTION

Field of the invention

This invention relates to the method for the preparation of 1,2-butadiene. More specifically it relates to a process for producing 1,2-butadiene from 1,3-butadiene.

Description of the related prior art 1,2-butadiene is particularly useful in the polymerization of 1,3-butadiene catalyzed by alkyllithium catalysts. Its presence serves to minimize gel-formation.

The 1,2-butadiene can be obtained from crude 1,3-butadiene by distillation. However, unless there is sufficient use for the 1,2-butadiene to warrant large scale distillation, this separation is expensive.

Moreover, crude 1,3-butadiene which contains 1,2-butadiene in small proportions also contains acetylenes such as 1-butyne and 1-butene-3-yne, both of which are alpha-acetylenes that react with the lithiumalkyl catalyst. Therefore when 1,2-butadiene is recovered from a crude 1,3-butadiene or a concentrate therefrom, it is imperative that these alpha acetylenes are removed before the 1,2-butadiene is used in the 1,3-butadiene polymerization.

SUMMARY OF THE INVENTION

In accordance with the present invention, it has now been found that 1,3-butadiene can be converted to 1,2-butadiene and that the product produced by such conversion has no alpha-acetylene therein and thereby avoids the necessity for removal thereof before the 1,2-butadiene is used in 1,3-butadiene polymerizations. Moreover the 1,2-butadiene can be prepared by the zinc dust dehydrohalogenation of either 2,3-dichloro-1-butene or 1,2-dichloro-2-butene or mixtures thereof regardless of the manner in which such dichlorobutene is prepared. In turn the dichlorobutene can be prepared from 1,2,3-trichlorobutane by reactions with solid KOH regardless of the source or method for producing the trichlorobutane. Advantageously the trichlorobutane can be prepared by the reaction of chlorine with either 1-chloro-2-butene or 3-chloro-1-butene or a mixture thereof, and advantageously the aforementioned monochlorobutene can be produced from 1,3-butadiene by reaction with concentrated hydrochloric acid, preferably fuming HCl.

The various steps for preparing 1,2-butadiene from 1,3-butadiene according to the process of this invention are outlined as follows:

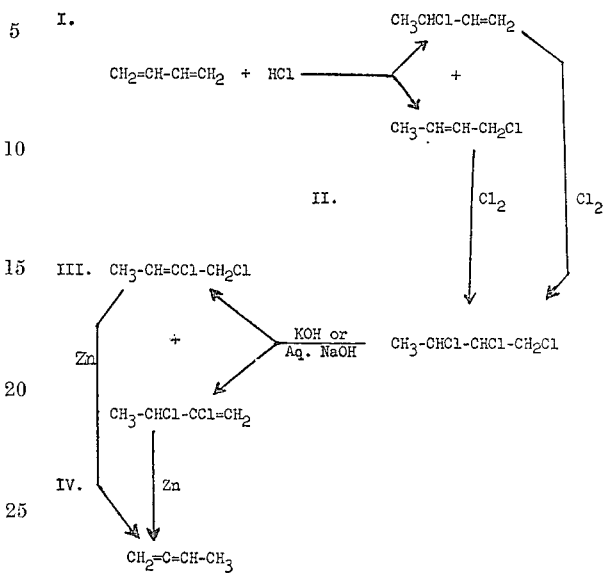

Surprisingly it is found that in the two reaction steps where mixtures of products are obtained, namely in Reactions I and III, the mixture of products can be subsequently reacted in each case to produce a single product. Thus Reaction I produces a mixture of 3-chloro-1-butene and 1-chloro-2-butene. However chlorination of these two products obtained from Reaction I gives only a single product. Thus in Reaction II, chlorination of the two products from Reaction I performed either individually or in admixture gives 1,2,3-trichlorobutane. If, on the other hand, the product from Reaction I was a mixture containing, in addition to or in place of either of the components, another type of product which would give on chlorination a product other than the 1,2,3-trichlorobutane, then a separation step would be required either before or after the Reaction II chlorination step.

Likewise dehydrochlorination with KOH, etc., or aqueous NaOH as in Reaction III, gives a mixture of two dichlorobutenes, each of which upon dechlorination with zinc gives the same product, namely 1,2-butadiene. Fortunately and surprisingly the product from Reaction III does not have another component in addition to or in place of one of the dichlorobutenes. If it did the dechlorination or reaction with zinc would very likely give a product other than 1,2-butadiene. This would require another separation step either before or after the reaction with zinc. It may be seen therefore that the series of steps outlined above for converting 1,3-butadiene to 1,2-butadiene has a number of unexpected advantageous features.

While Reactions II and IV can be performed by using the starting materials from Reactions I and III respectively either individually or in mixture, and regardless of the source of such starting materials, it is preferred for reasons of economy and availability that the starting materials be those obtained by the above series of reactions starting with 1,3-butadiene. Nevertheless, if either 1,2-dichloro-2-butene or 2,3-dichloro-1-butene is available from other sources, either individually or in mixture, such materials can be used as the starting material for Reaction III. Likewise if the starting materials for Reactions II and IV are available from sources other than the series of reactions indicated above, such materials can be used in the indicated reactions.

In the hydrochlorination of Reaction I an excess of 45% HCl aqueous or fuming hydrochloric acid is preferably used. If only the theoretical amount of 45% or fuming hydrochloric acid is used, or if a less concentrated hydrochloric acid is used, the conversion will be lower, or the period of reaction will have to be prolonged in order to approach theoretical conversion. For example, if commerical grade concentrated hydrochloric acid, which contains about 37% HCl is used, a greater excess of acid and longer reaction time will be required to approach theoretical conversion. Moreover, while higher temperatures can be used to speed the reaction, this entails greatly increased pressure. Therefore room temperature or temperatures only slightly above room temperature are preferred. Solvents other than water can also be used, but the efficiency is no greater and additional expense is thereby involved.

In Reaction II the chlorination is effected at low temperature and in the absence of light to prevent or retard the substitution of chlorine for hydrogen in the reactants and products. By the use of low temperatures and in the absence of light, chlorine reaction is confined primarily to addition to the double bonds. This reaction is so complete that there is no need for using any excess chlorine.

Reaction III is performed most quickly and most efficiently by the use of dry KOH in considerable excess. If aqueous NaOH is used, the reaction is much slower and the yield of the desired dichlorobutenes is much lower. This reaction can be expedited by using elevated temperatures and pressure. However, this favors the formation of hydroxy derivatives. The powdered hydroxides of sodium, lithium, rubidium, cesium, calcium, strontium and barium can also be used in place of the KOH. However, the KOH is preferred. It is noted also that these alternative strong alkalis likewise have the advantage of giving the two components, namely the two specified dichlorobutenes, which upon reaction with Zn give 1,2-butadiene.

In Reaction IV, the catalyst or reagent used for dechlorination must be carefully selected so as to avoid converting the 1,2-butadiene to its isomer, 1,3-butadiene. Such conversion defeats the whole purpose of the invention since a part of the product would be reconverted to the starting material. For example, most metallic chlorides, as well as copper at 200° C., will convert the 1,2-butadiene to 1,3-butadiene. High temperatures will likewise cause this conversion. In addition to zinc, other suitable materials for satisfactorily effecting Reaction IV are the alkali metals, magnesium, calcium, strontium, cadmium, barium, aluminum, iron and various alloys of these metals with each other or with zinc.

The invention is illustrated by the following examples. These examples are intended merely for illustrative purposes and are not to be regarded as limiting the scope of the invention nor the manner in which it may be practiced. Parts and percentages, except where specifically indicated otherwise, are by weight.

EXAMPLE I

Hydrochlorination of 1,3-butadiene

Fuming hydrochloric acid is prepared by cooling concentrated hydrochloric acid (approximately 37% HCl) to 0° C. and then bubbling in gaseous hydrogen chloride over a period of approximately 2 hours. When the specific gravity, $d_4°$, is 1.2295, the solution contains approximately 45% HCl. The fuming hydrochloric acid is kept at 0° C. until used.

Four clean 28-oz. beverage bottles are cooled to −20° C. in a Dry Ice bath. Then each is charged with 400 grams of the fuming hydrochloric acid prepared above. After the acid has cooled somewhat, 108.2 grams of distilled 1,3-butadiene is added to each of the four bottles, following which each bottle is capped immediately. The bottles are removed from the Dry Ice bath and allowed to come to room temperature. Each bottle is placed in a bottle guard and then placed in a bath maintained at 24° C. and provided with a means for rotating the bottles at a rate of one turn per 3.2 seconds. These conditions are maintained for 24 hours, following which the bottles are removed from the bath. The bottles are then cooled in ice for about one-half hour. Then the bottles are opened and the contents poured into a single ice-cooled 3-liter separatory funnel for separation of the resulting layers. The organic layer weighs 717.15 grams while the aqueous acid layer weighs 1314.5 grams. This represents a gain of 284.35 grams for the 1,3-butadiene layer and a loss of 285.5 grams in the aqueous hydrochloric acid layer. The organic layer is then cooled to −78° C. for 16 hours in order to further remove acid by freezing. This leaves 713.65 grams of reasonably dry chlorobutene mixture. This mixture is placed in a 1-liter flask and fractionated in a column having an O.D. of 2.4 cm. and a length of 47 cm., packed with ³⁄₃₂-in. Pyrex helices and having a stillhead with 10° C. cooling water. Beyond the stillhead a trap is provided cooled with Dry Ice. Low boiling fractions are obtained at 62.9–63.7° C. at 730.5 mm. which yields 148.8 grams of 3-chloro-1-butene. A pure 1-chloro-2-butene fraction is obtained at 82.9–83.4° C. at a pressure of 731.8–735.4 mm. The yield of this fraction is 368.5 grams. An additional fraction is obtained boiling above 83.4° C. at 731.8 mm. This contains an additional 8.7 grams of 1-chloro-2-butene. Combination and further purification of various fractions eventually gives a yield of 29.58% theoretical yield of 3-chloro-1-butene and 64.24% of theoretical yield of 1-chloro-2-butene, totalling 93.82% theoretical yield of the monochlorobutenes.

EXAMPLE II

Chlorination of 3-chloro-1-butene to 1,2,3-trichlorobutane

To a 250-ml. flask there is charged 148.15 grams of 3-chloro-1-butene, and the flask and contents are cooled with Dry Ice to −40° C. The flask is retained in the Dry Ice bath and kept in the dark while gaseous chlorine is fed into the liquid with occasional stirring. The temperature rises rapidly to approximately 0° C. The chlorine feed is continued until by periodic weighings it is determined that 116 grams of chlorine are added. This takes approximately 169 minutes at −40° to 4° C. The product is washed with 200 ml. of 5% aqueous potassium carbonate solution, then with 400 ml. of water and then dried for 72 hours over 10 grams of anhydrous calcium chloride. The yield is 254.35 grams. This product is identified by chromatography as 93.5 mole percent 1,2,3-trichlorobutane. Fractionation yields 187.7 grams of pure 1,2,3-trichlorobutane (B.P. 67.0–68.0° C. at 22.5 mm.) and 54.85 of lower and high boiling fractions. Low and high boiling fractions are refractionated to yield more pure 1,2,3-trichlorobutane.

EXAMPLE IIa

Chlorination of 1-chloro-2-butene to 1,2,3-trichlorobutane

The procedure of Example II is repeated except that an equivalent amount of 1-chloro-2-butene is used in place of the 3-chloro-1-butene of Example II. After processing as in Example II, the product is identified by chromatography as 1,2,3-trichlorobutane. A yield of 615.45 grams or 88.01 mole percent trichlorobutane are obtained. Exactly 507.75 grams of pure 1,2,3-trichlorobutane is distilled between 67.0 and 70.0° C. at 23 mm. The 109.8 grams of low and high boiling material are refractionated to yield more pure 1,2,3-trichlorobutane.

EXAMPLE IIb

Chlorination of a mixture of 3-chloro-1-butene and 1-chloro-2-butene to give 1,2,3-trichlorobutane The procedure of Example II is repeated using an equivalent amount of a mixture of 3-chloro-1-butene and 1-chloro-2-butene boiling at 63.7–82.9° C. at 730.5 mm. The product after processing as in Example II is found to weigh 227.9 grams and it is 88.92 mole percent of 1,2,3-trichlorobutane. Fractionation yields 196.6 grams of pure 1,2,3-trichlorobutane (B.P. 67.0–68.0° C. at 22.5 mm.). Exactly 30.55 grams of low and high boiling material are refractionated to obtain more pure 1,2,3-trichlorobutane.

EXAMPLE III

Dehydrochlorination of 1,2,3-trichlorobutane with powdered KOH

To a 1-liter flask equipped with a simple stillhead and thermometer there are charged 168 grams of powdered potassium hydroxide and 161.5 grams of 1,2,3-trichlorobutane, a KOH to trichlorobutane ratio of 3:1. The stillhead outlet is connected to a 27-cm. condenser. The mixture is heated slightly, whereupon a vigorous reaction starts which is over in 3 to 4 minutes. Then heating is continued for about another 10 minutes to expel any remaining organic liquid. The total distilled wet organic liquid weighs 131 grams. This is dried over 25 grams of anhydrous calcium chloride to give 126.2 grams of dry, crude dichlorobutene. Chromatographic analysis shows this product to be 26.33 mole percent of 2,3-dichloro-1-butene, 37.35 mole percent of both isomers of 1,2-dichloro-2-butene and 22.84 mole percent of unreacted 1,2,3-trichlorobutane.

EXAMPLE IIIa

The procedure of Example III is repeated except that after the reaction has subsided and the wet organic material has been distilled, the reaction residue is removed from the flask, pulversized, then returned to the flask and an additional 126.25 grams of powdered potassium hydroxide added, followed by the addition of 161.45 grams of 1,2,3-trichlorobutane. The charge in the flask is quickly mixed, and then attached to the distilling system. This reaction is initiated by heating the reactor with a small flame. This second reaction is not as vigorous as the first, but the reaction mixture fills about ¾ of the flask. After the initial reaction subsides the reactor is heated for another 7 minutes. The wet organic distillate weighs 134.9 grams. The 125.7 and 134.9 grams of wet, crude dichlorobutene distillate are combined and dried with 25 grams of anhydrous calcium chloride. The proportion of reagents in this case is 5.25 moles of KOH to 2 moles of trichlorobutane or a mole ratio of 2.625 KOH per mole of trichlorobutane as compared to a ratio of 3 moles KOH per mole of trichlorobutane in Example III. In this case the product is 38.76 mole percent of 2,3-dichloro-1-butene, 43.25 mole percent of 1,2-dichloro-2-butene and 9.53 mole percent of unreacted 1,2,3-trichlorobutane.

EXAMPLE IIIb

The procedure of Example III is repeated except that 123.4 grams of powdered KOH is used. This represents a ratio of 2.2 moles of KOH per mole of trichlorobutane. The dry product (132.1 grams) is composed of 27.41 mole percent of 2,3-dichloro-1-butene, 40.5 mole percent of both isomers of 1,2-dichloro-2-butene and 27.14 mole percent of unreacted 1,2,3-trichlorobutane.

EXAMPLE IIIc

The procedure of Example III is repeated except that 100.8 grams of powdered KOH is used. This represents a mole ratio of 1.8 moles of KOH per mole of trichlorobutane. The 241.3 grams of dry product is composed of 25.81 mole percent of 2,3-dichloro-1-butene, 36.47 mole percent of both geometric isomers of 1,2-dichloro-2-butene and 32.78 mole percent of unreacted 1,2,3-trichlorobutane.

EXAMPLE IIId

The procedure of Example III is repeated with successful results in the production of the two dichlorobutenes using in place of the KOH powdered NaOH, LiOH, rubidium hydroxide, cesium hydroxide, calcium hydroxide, strontium hydroxide and barium hydroxide respectively.

The results obtained by varying the mole ratio of KOH to trichlorobutane are summarized below in Table I.

TABLE I

| Mol. ratio KOH/trichlorobutane | Mole percent total of dichlorobutenes (of theoretical) | Mole percent unreacted 1,2,3-trichlorobutane (of theoretical) |
| --- | --- | --- |
| 3.750/1 | 60.8 | 27.4 |
| 3.00/1 | 70.5 | 21.9 |
| 2.625/1* | 80.4 | 9.3 |
| 2.20/1 | 67.4 | 26.9 |
| 1.80/1 | 63.2 | 33.3 |

*Two steps.

EXAMPLE IV

Conversion of dichlorobutenes to 1,2-butadiene

A 1-liter, 3-necked flask is fitted with a heating mantle, a 125-ml. dropping funnel, a nitrogen inlet and 2 Dry Ice-cooled traps connected to the condenser adapter outlet by means of short lengths of glass tubing and neoprene tubing. To the flask there are added 277.25 grams of zinc dust and 350 ml. of absolute ethanol. This is slurried. Then the zinc-alcohol slurry is heated to a very gentle reflux. In the course of 90 minutes, with nitrogen flowing into the reactor at the rate of about ¼ ml. per second, 132.76 grams of a mixture of 2,3-dichloro-1-butene and 1,2-dichloro-2-butene are run dropwise from the dropping funnel into the refluxing alcohol-zinc slurry. The dichlorobutene mixture comprises 43.51 mole percent of 2,3-dichloro-1-butene and 54 mole percent of 1,2-dichloro-2-butene. Just enough heat is supplied to the reaction mixture to maintain gentle refluxing. After all the dichlorobutene mixture is added, the liquid collected in the two traps totals 54.7 grams. The reaction mixture is refluxed for another hour with a condenser temperature of 30° C. and an additional amount of liquid is collected in the traps to give a total of 56.85 grams. The reaction is then stopped and the zinc slurry discarded. The 56.85 grams of trapped liquid are fractionated, collecting 49.05 grams at 9.0–11.0° C. at 731 mm., a yield of 85.4% of theory of butadiene. Chromatographic analysis shows this product to contain 88.29 mole percent of 1,2-butadiene and 10.42 mole percent of 1,3-butadiene.

EXAMPLE IVa

The procedure of Example IV is repeated a number of times with similar results using instead of the mixture of dichlorobutenes equivalent amounts of the 2,3-dichloro-1-butene and 1,2-dichloro-2-butene components individually.

In the various reaction steps described herein, it is generally preferred to use an excess of the reagent being used with the particular starting material or intermediate, namely the 1,3-butadiene or chlorinated butene or trichlorobutane. However, while such excess is desirable in order to completely and quickly convert the intermediate to the next product, it is not critical that an excess be used since there will be some conversion even if less than stoichiometric amount is used. In such case, however, unreacted starting material generally has to be separated from the product so as not to be retained through the subsequent steps.

With regard to temperature and pressure conditions, these are likewise not critical except as to what is practical with regard to reaction rate and retention of the materials in contact with each other, or to reduce the production of undesired byproducts. However, the hydrochlorination of 1,3-butadiene is advantageously conducted at a temperature in the range of 0–50° C., preferably 20–40° C. The chlorination of the monochlorobutene is desirably conducted at a low temperature and in the absence of light in order to avoid side reactions by replacement of hydrogen with chlorine. Generally low temperatures in the range of −50° to 0° C. are preferred.

In the conversion of trichlorobutane to dichlorobutenes, this can be reacted at various temperatures from 0° to 100° C., and even higher when pressure equipment is used, depending upon the rate of reaction of the alkaline materials used to remove HCl. If the entire amount of the alkaline material is added initially, the temperature preferably should be relatively low so as to accommodate the exothermic heat that is given off. However, if the alkaline reagent is added gradually, then the amount of heat given off can be controlled by the rate of addition of this reagent. In such case relatively higher temperatures can be used within the range indicated.

In the reaction in which a powdered metal is reacted to convert the dichlorobutene to 1,2-butadiene, a temperature in the range of 40-100° C. is preferred in order to give a practical reaction rate. In order to maintain more effective control and reaction rate, the reaction is advantageously conducted in a polar medium such as an alcohol of 1-5 carbon atoms. It is also advantageous to control the reaction temperature by selecting an alcohol such as ethanol that has a reflux temperature in the appropriate or desired temperature range.

EXAMPLE V

The procedure of Example IV is repeated a number of times using individually in place of the Zn an equivalent weight of Na, K, Li, Mg, Ca, Sr, Cd, Ba and Al respectively. The more reactive metals, namely Na, K, Li, Mg and Ca, are added as a suspension in toluene, the latter being used in an amount about equal to the amount of alcohol added and the subsequent heating being very mild. In each case the dichlorobutene is dechlorinated to 1,2-butadiene.

EXAMPLE VI

The procedure of Example IV is repeated a number of times using individually in place of the ethanol an equal amount of methanol, isopropanol, sec.-butanol and isoamyl alcohol respectively. In each case satisfactory production of 1,2-butadiene is effected.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. The process of preparing 1,2-butadiene, free of alpha-acetylenes, from 1,3-butadiene comprising the steps of:
   (a) reacting 1,3-butadiene with concentrated hydrochloric acid to produce monochlorobutene;
   (b) reacting said monochlorobutene with chlorine to produce 1,2,3-trichlorobutane;
   (c) reacting said 1,2,3-trichlorobutane with an alkaline material selected from the class consisting of dry powdered KOH, NaOH, LiOH, CsOH, Ca(OH)$_2$, Sr(OH)$_2$, Ba(OH)$_2$, RbOH and aqueous NaOH and KOH, to produce dichlorobutene;
   (d) reacting said dichlorobutene with a powdered metal selected from the class consisting of Zn, Na, K, Li, Mg, Ca, Sr, Cd, Ba, Al and alloys consisting essentially of two or more of said metals; and
   (e) recovering said 1,2-butadiene.

2. The process of claim 1 in which said Step (d) is effected in intimate contact with an alcohol of 1-5 carbon atoms.

3. The process of claim 2 in which said alkaline material of Step (c) is dry powdered KOH.

4. The process of claim 3 in which said powdered metal of Step (d) is Zn.

5. The process of claim 1 in which said powdered metal of Step (d) is Zn.

6. The process of claim 5 in which said alkaline material of Step (c) is dry powdered KOH.

7. The process of claim 6 in which said KOH is used in a proportion of 1.8 to 3.75 moles per mole of 1,2,3-trichlorobutane.

8. The process of claim 6 in which said Step (d) is effected in intimate contact with anhydrous ethanol.

9. The process of claim 8 in which said ethanol is at reflux temperature.

References Cited

Hurd et al.: J. Amer. Chem. Soc. (1931), vol. 53, pp. 289–294.

Huntress: Organic Chlorine Compounds, pub. by John Wiley & Sons, New York (1948), pp. 771, 980 and 1007.

PAUL M. COUGHLAN, JR., Primary Examiner

U.S. Cl. X.R.
260—654, 658, 659